(12) United States Patent
Stevenson et al.

(10) Patent No.: US 6,819,445 B1
(45) Date of Patent: Nov. 16, 2004

(54) DIGITAL PRINTING SYSTEM WHICH RETAINS RECENT FILES FOR RAPID OUTPUT

(75) Inventors: Duncan I. Stevenson, St. Albans (GB); Alison M. Howse, Knebworth (GB); Stephen J. Abbott, Luton (GB)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/491,035

(22) Filed: Jan. 25, 2000

(51) Int. Cl.[7] .............................. B41B 4/00; B41F 1/00; E06K 15/02; G06F 3/12; G06F 15/00

(52) U.S. Cl. .................... 358/1.15; 358/1.16; 358/1.18; 707/203; 707/204; 709/223

(58) Field of Search .............................. 358/1.14, 1.15, 358/1.16, 1.18; 707/204, 203; 709/223

(56) References Cited

U.S. PATENT DOCUMENTS 6,466,329 B1 * 10/2002 Mukai ....................... 358/1.15

* cited by examiner

Primary Examiner—Edward Coles
Assistant Examiner—David L. Jones
(74) Attorney, Agent, or Firm—R. Hutter

(57) ABSTRACT

A printing system, available to a population of users on a network, checks whether files in recently-received print jobs are identical to files which have been previously decomposed or rasterized within a particular time frame prior to the submission of the job. If it is detected that a file to be printed in a recently-submitted job is identical to a file which has already been rasterized with the rasterized image available in memory, the system substitutes the already-rasterized file for the file submitted with the job, thus saving the time and resources for rasterizing the file in the recently-submitted job.

6 Claims, 2 Drawing Sheets

DIGITAL PRINTING SYSTEM WHICH RETAINS RECENT FILES FOR RAPID OUTPUT

FIELD OF THE INVENTION

The present invention relates to a digital printing apparatus, particularly a relatively high-speed printing apparatus which is shared among numerous independent users.

BACKGROUND OF THE INVENTION

In typical office environments, it is often desirable to have a single relatively high-speed digital printer be shared among numerous users, each user having a computer from which he can send a job to be printed to the printer. A common consideration when a single printer is shared among numerous users is the "decomposing" or "rasterizing" of jobs submitted to the printer. As is well known in the art, files submitted for printing to a computer are typically of one of a number of standard formats, in particular, page description languages such as Adobe® PostScript™ or PCL, and other formats such as TIFF or ASCII, as well as facsimile formats. A large central printer serving a large population of users is preferably equipped with numerous "decomposers" or "rasterizers" which convert image data submitted to the printer in a particular format, to a format which is more directly operative of the printer hardware. The decomposed or rasterized files, before they are used to operate printing apparatus to print a series of desired images, are typically retained in a compressed form until the precise moment when a particular page image desired to be printed within a particular user's job is ready to be submitted to the printer hardware.

Although compression of a decomposed or rasterized image saves space when the image data is waiting to be printed, the compressed image files are still usually much larger than the original image data (such as in a page description language) which was originally submitted by the user. Further, as is well known, decomposing or rasterizing an image in a page description language represents a major computational function of the printer: indeed, in many situations the time it takes to decompose or rasterize original image data acts as a constraint on the output speed of the printer hardware. It is therefore desirable to decompose or rasterize image data in a page description language only when necessary.

As a practical matter, in many contexts of multiple users sharing a single printer, more than one user may desire to print an identical file within a reasonable time span. For example, if a set of users sharing a printer in one office all receive an e-mail with attachment simultaneously, it is fairly likely that more than one user will eventually wish to print out the attachment within the same business day. The present invention exploits this common occurrence to increase the overall performance of a printing system.

DESCRIPTION OF THE PRIOR ART

In the prior art, U.S. Pat. No. 5,715,379 shows, in overview, the function of a digital printing system including a plurality of decomposers which operate simultaneously and independently. As individual page images are decomposed by various decomposers, a buffer manager directs the decomposed images to a central memory, and records the exact location in memory of different page images from different jobs. In this way, a large number of users, using various page description languages and other formats, can share a high-speed printing apparatus.

U.S. Pat. No. 5,848,226 shows a system for prioritizing data transfer in a high-volume digital printing apparatus.

U.S. Pat. No. 5,881,213 discloses a system for supporting deferred printing of print jobs. The processes of spooling and despooling the print job are decoupled, such that a printer need not be available at the time of spooling. Print jobs are spooled in a device-independent format, and may be spooled without a printer driver being installed for a target printer. Later, when the target printer becomes available, the print job is despooled and printed.

SUMMARY OF THE INVENTION

According to the present invention, there is provided a method and apparatus for printing files based on digital data. A rasterizer converts files in an original image format to a rasterized data format suitable for submission to printing hardware. A memory retains rasterized data corresponding to files requested to be printed. It is determined whether a file requested to be printed corresponds to a pre-existing quantity of rasterized image data in the memory. The pre-existing quantity of rasterized image data in the memory is submitted to the printing hardware if the file requested to be printed corresponds thereto.

DETAILED DESCRIPTION OF THE INVENTION

Figure 1:
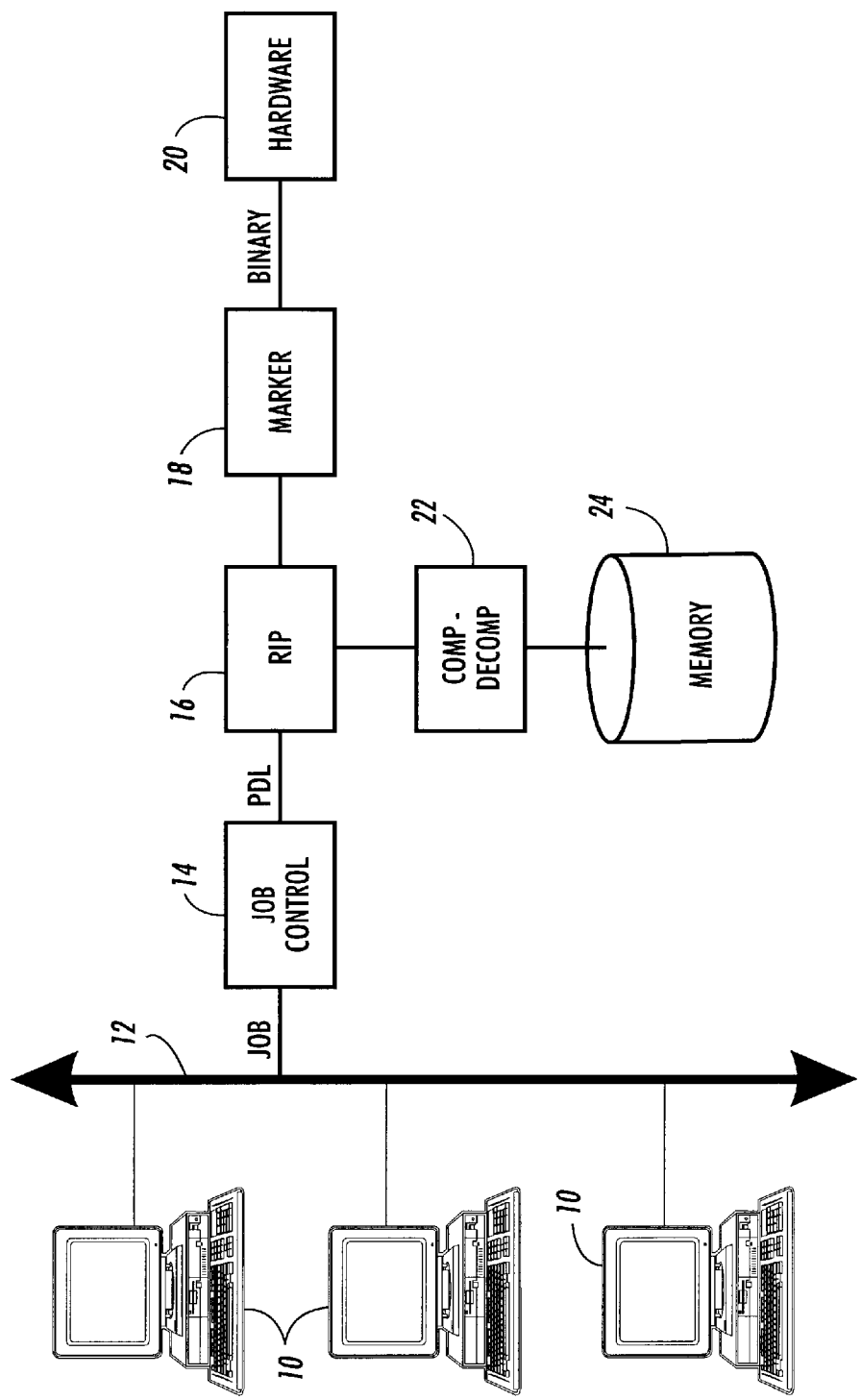
FIG. 1 is a simplified systems view showing the essential elements of a digital printing apparatus that is shared among a population of users on a network.

FIG. 1 is a simplified systems view of the essential elements of a digital printing apparatus to be shared among a population of users, in which the present invention can be used. A population of users, each user having a computer such as 10, are connected via a network 12, through means familiar in the art, to a central printing apparatus, which may of course be one of several printers available through network 12. The essential elements of a printer, with relevance to the present invention, include what can here be called a job control 14, a raster image processor or RIP, 16, and a marker 18 which is directly operative of printing hardware 20. The printing hardware 20 can be any type of marking device known in the art, such as an ink-jet printer, electrophotographic "laser" printer, or ionographic printer. The marker 18 is here used as a term of convenience to indicate software which is directly operative of the printing hardware 20.

The raster image processor (RIP) 16 preferably includes what is generally known in the art as a "decomposer" or "interpreter", but which for convenience can be generally called a "rasterizer." The function of the RIP 16 is to take image data representative of an image desired to be printed, which is in a standard format, and convert this data into "rasterized" data, which can ultimately be sent directly to the marker for direct operation of hardware 20. As mentioned above, typical original formats of data submitted over network 12 include page description languages such as Adobe® PostScript™ or HP-PCL, or other formats such as ASCII or TIFF or facsimile formats. (As used in the claims herein, "rasterizing" shall mean converting image data from an original format, such as a page description language, to a format which can be submitted directly to printer hardware, although such "rasterized" data may at some time be compressed in a conventional manner, as will be explained below.)

The RIP 16 also accesses a compressor/decompressor 22 and a memory 24. A typical function of the compressor/decompressor 22 and memory 24 is given in detail in the '379 patent referenced above, but basically, once the RIP 16 rasterizes a file submitted thereto, the rasterized image data must typically wait for a certain period of time until the data related to a specific page image is ready to be printed by the hardware 20; for example, even if all the individual page images in a 10-page file are rasterized by RIP 16, these individual page images must of course be submitted to the hardware 20 in page order. Thus, while individual rasterized page images wait to be submitted to the hardware 20, the page images are compressed by compressor/decompressor 22 and temporarily retained in memory 24, until almost the precise moment in which a particular page image is required by the printing hardware 20. Once again, standard compression or decompression of rasterized page image data, such as by runlength encoding, is a relatively simple matter, compared to the original rasterization of the submitted file.

With specific regard to the present invention, it is fairly common, in a practical context, that more than one user of a particular printing apparatus on network 12 will wish to print out the same file within a reasonably short time span. Once again, if numerous users all receive the same e-mail with attachment, it is fairly common that more than one user will want to print out the attachment within the same day. The present invention is a system, typically embodied within job control 14, which exploits this situation to increase the overall efficiency of a printing apparatus.

In brief, according to the present invention, once a job is submitted to job control 14 (a "job" including the request to print out at least one "file"), the job control 14 in effect checks to see if the same file has already been rasterized by RIP 16 and already exists in rasterized, compressed form in memory 24. If the most recent job is a request to print out a file which has already been rasterized and which currently exists in memory 24, then the file submitted with the new job is not rasterized, but rather the already-rasterized image data and memory 24 is retrieved and submitted to marker 18. Ideally, this process of substitution of a previously-rasterized file should be invisible to the various users of the printing apparatus. In this way, within a particular time frame such as one day, a file need only be rasterized once for printing of any number of prints.

Figure 2:
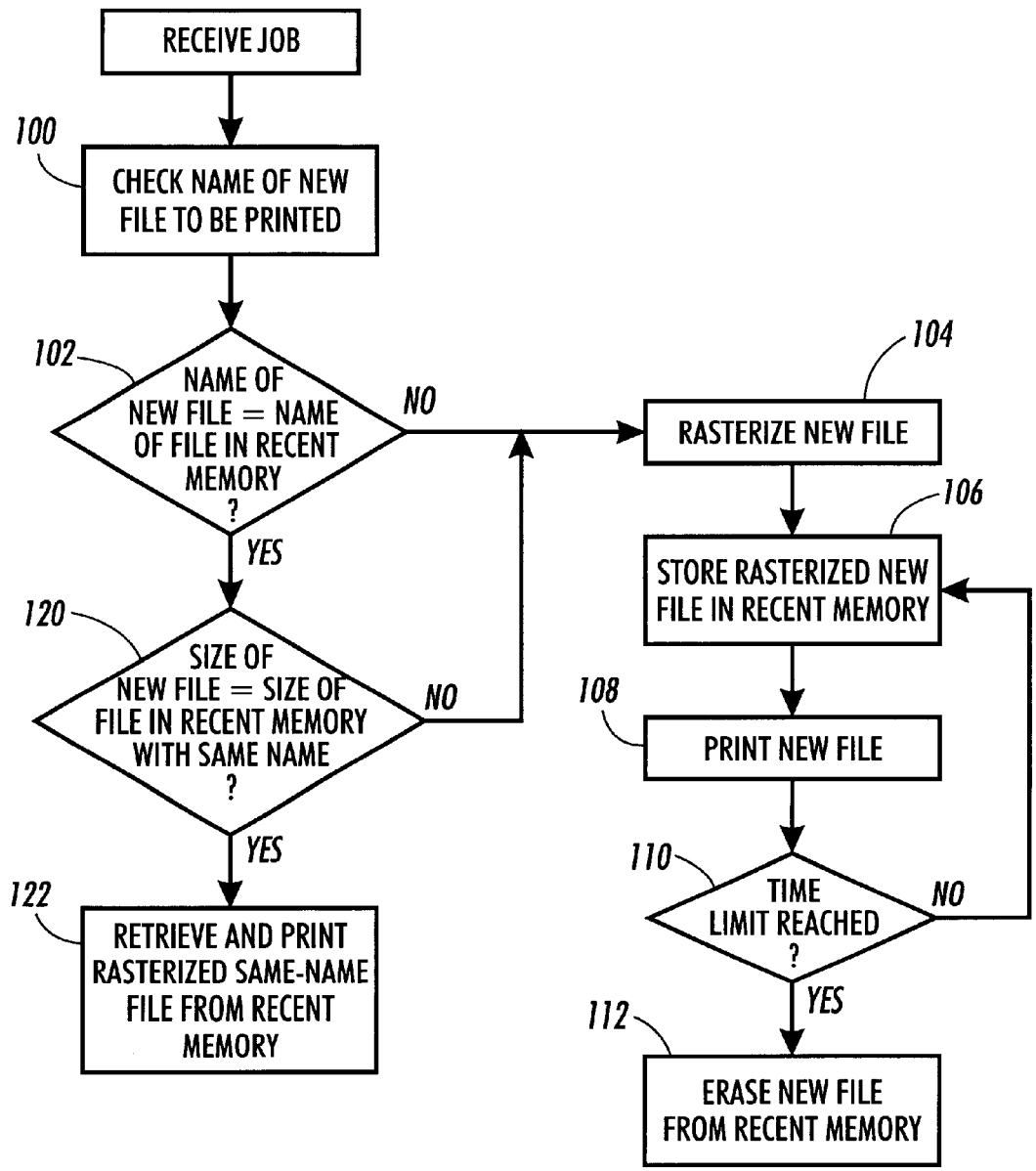
FIG. 2 is a flow chart illustrating the operation of a job control system in a digital printing apparatus, according to the present invention.

FIG. 2 is a flow chart showing the essential steps of carrying out the present invention. The steps typically occur within the software of job control 14. When a job is received over the network, the job will include the name of at least one file requested to be printed (step 100). When information about this file is read by job control 14, the name of this new file is checked against the names of files in memory 24 (step 102). According to the preferred embodiment of the present invention, the "name" of the new file may also include data such as version number, file size, and last saved date of the file so that, if one user submits subsequent versions of the same-named file, it will be recognized that the two different versions represent different files.

It should also be noted that the memory 24 can be organized to include a special "recent memory" area, meaning a portion of memory 24 can be segregated for this specific purpose of retaining recently-rasterized files, with other portions of the same memory 24 being dedicated to different purposes.

If the name of the new file mentioned in the most recently-received job does not match the name of a file that is stored in rasterized form in recent memory, then this new file is rasterized and temporarily stored in memory 24, as shown at step 104. Because the job includes a request for printing of the file therein, once the new file is rasterized the rasterized new file is stored in memory 24, as shown at step 106, then printed at an appropriate time, such as at step 108.

At this point, even after the file has been printed, the rasterized new file is stored in the memory 24 for a particular period of time. Preferably the rasterized file remains in memory 24 long enough to have an opportunity to be submitted to the printing hardware if some other user of the printer would like to print the same file, in a manner which will be described in detail below. However, of course, there are inevitably limits to how long in particular rasterized file maybe retained in memory 24. Step 110 indicates generally determining whether a time limit is reached for a rasterized file to remain in recent memory 24, and, if this time limit is reached, the file is erased from recent memory, such as shown at step 112.

It should be appreciated that the general concept of a "time limit" can be manifest in various ways. In one sense, the time limit could be a clock time limit, such as having any rasterized file in memory 24 removed twenty four hours after the first or last retrieval of the rasterized image data. Alternately, there could simply be a "first in, first out" system with regard to the finite size of the recent memory, in which rasterized files can be stored in recent memory for as long as there is sufficient room for them, with "old" rasterized files being removed from the memory as they are pushed out by "new" rasterized files entering the memory. Alternately, such a first in, first out system could be organized simply by allowing a finite number of files to remain in the memory 24 (e.g., only the last ten files are retained, basically regardless of the size of the files). Other variations on the general "time limit" concept will be apparent.

Once a rasterized file exists in recent memory, according to the present invention, this rasterized file can be repeatedly retrieved and printed out by marker 18 and hardware 20 in response to subsequent job requests received by job control 14. As mentioned above, retrieval of the already-rasterized image from memory 24 is typically faster and more efficient than having to re-rasterize the file incoming with every particular job entering job control 14 from a large population of users.

Step 120 is an optional secondary check on the decision at step 102, the decision of whether the name of a new file in a subsequently-received job is the name of a file that has already been rasterized and stored in recent memory. Just taking into account the fact that simple file names (such as 8 character names) have a high probability of duplication, a secondary check such as 120, which determines whether the file in a recently-received job is of the same size as a rasterized file of the same name in memory 24, can be used to overcome such possible sources of error. Alternative techniques for a secondary check 120 could include checking the date of the newly-submitted file against the rasterized file in memory 24, or doing some sort of checksum process on the data of the newly-submitted file.

Preferably, this substitution of an already-rasterized file for the recently-submitted file would be invisible to the user, although it may be desirable to indicate to the user, such a through a window on the user's computer, that a previously-rasterized version of the file in his job is being output.

What is claimed is:

1. A method of operating a system for printing files based on digital data, the system comprising a rasterizer, for converting files in an original image format to a rasterized data format suitable for submission to printing hardware and a memory for retaining rasterized data corresponding to files requested to be printed, comprising the steps of rasterizing a file submitted electronically to be printed, the file having a name at the time of submission;

retaining in the memory rasterized image data derived from the submitted recording the name of the submitted file;

receiving an electronic request to print a file;

determining whether the file requested to be printed corresponds to a pre-existing quantity of rasterized image data in the memory, the determining step including comparing a name of the file requested to be printed with the name of the submitted file; and causing the pre-existing quantity of rasterized image data in the memory to be submitted to the printing hardware if the file requested to be printed corresponds thereto.

2. The method of claim 1, further comprising the step of causing the memory to retain rasterized data corresponding to a file for a predetermined time.

3. The method of claim 1, further comprising the step of causing the memory to retain rasterized data corresponding to a file according to a first-in, first-out arrangement.

4. The method of claim 1, the name of the file including a version number.

5. The method of claim 1, the name of the file including a file size.

6. The method of claim 1, the name of the file including a last saved date associated with the file.

* * * * *